United States Patent [19]

Bingham

[11] Patent Number: 4,912,338
[45] Date of Patent: Mar. 27, 1990

[54] SAFETY SYSTEM FOR A GAS OPERATED APPLIANCE IN A VEHICLE

[75] Inventor: Lynn R. Bingham, Tulsa, Okla.
[73] Assignee: Pizza Hut, Inc., Wichita, Kans.
[21] Appl. No.: 259,041
[22] Filed: Oct. 17, 1988
[51] Int. Cl.⁴ .............................................. B60P 3/00
[52] U.S. Cl. ...................................... 307/9.1; 307/112;
    307/10.1; 307/39; 340/634; 219/506; 219/509;
    137/613; 426/302; 426/289; 296/22; 296/24.1;
    126/299 D; 126/299 R
[58] Field of Search .............. 307/9, 10 R, 39, 10 BP,
    307/ 112; 219/218, 386, 403, 452, 506, 509, 521;
    126/21 R, 21 A, 25 R, 25 A, 26, 41, 42, 273 A,
    276, 299 R, 299 D; 296/24.1, 20, 22, 156, 171,
    178; 426/289, 302, 523; 340/628, 634; 137/416,
    425, 446, 558, 495, 557; 251/68, 70

[56] References Cited

U.S. PATENT DOCUMENTS

| | | | |
|---|---|---|---|
| 2,743,955 | 5/1956 | Willson | 296/23 |
| 4,070,670 | 1/1978 | Chen | 219/506 X |
| 4,098,284 | 7/1978 | Yamada | 137/613 X |
| 4,223,692 | 9/1980 | Perry | 340/634 X |
| 4,499,385 | 2/1985 | Slavik | 307/39 X |
| 4,556,046 | 12/1985 | Riffel et al. | 126/299 D |
| 4,617,472 | 10/1986 | Slavik | 307/39 X |
| 4,632,836 | 12/1986 | Abbott et al. | 426/302 |
| 4,643,167 | 2/1987 | Brewer | 126/299 |

Primary Examiner—William M. Shoop, Jr.
Assistant Examiner—Paul Ip
Attorney, Agent, or Firm—Willian Brinks Olds Hofer Gilson & Lione

[57] ABSTRACT

The present invention is a safety system for a gas operated appliance in a vehicle. The system includes means for generating an electrical signal, such as a pre-determined voltage. The system also includes means for interrupting this electrical signal. One such means is a gas sensing means which is designed to interrupt the electrical signal in response to sensing gas. Another such means is an inertia switch means which interrupts the electrical signal in response to detecting a rapid changes in vehicle inertia or vehicle orientation. Yet another such means is a high temperature switch means which interrupts the electrical signal in response to detecting an elevated temperature in an area near said appliance. Finally, the system includes an emergency kill switch means for manually interrupting the electrical signal. The system further includes a fuel tank and a gas line between the fuel tank and the appliance. A valve means is used which is adapted to automatically and mechanically close to thereby stop the flow of gas through the gas line. Coupled with this valve means is a solenoid means designed to open the valve means in response to said electrical signal to therey allow the flow of gas through the gas line.

27 Claims, 6 Drawing Sheets

SAFETY SYSTEM FOR A GAS OPERATED APPLIANCE IN A VEHICLE

BACKGROUND OF THE INVENTION

The present invention relates to the field of vehicle safety systems. More particularly, the invention relates to the field of safety systems for vehicles with gas operated appliances.

Appliances, such as ovens, heaters, refrigerators, hot water heaters, and electrical power generators, are available for use in vehicles. These vehicles can be recreation type vehicles such as RV's, vans, boats, campers, trailers, as well as food service or other commercial vehicles. For various reasons, it is popular to power these types of appliances in vehicles with a gas fuel, such as propane or natural gas.

An example of a food service vehicle with a gas powered oven is described in U.S. Pat. No. 4,632,836, to Abbott et al. and assigned to the same as the present application. This patent describes a pizza preparation and delivery system which is designed to deliver restaurant quality pizzas to the consumer's home or business. The entire disclosure of this '836 patent is incorporated herein by reference. The system described in this patent includes vehicles which were not only adapted to deliver the pizza, but also adapted to assemble and cook the pizza while in transit. Each vehicle in this system was equipped with a refrigerated case for storing pizza shells, a preparation station with pizza-toppings to create an assembled pizza, and a propane powered conveyor oven for cooking the assembled pizza.

The vehicles used in the preferred embodiment described in the '836 patent were modified FORD E-350 trucks with a van type body mounted thereon. Each vehicle included a driver's station and a kitchen area. A cook's chair was put in the kitchen area and the vehicle was laid out so that, while seated in the cook's chair, the cook could reach the pizza assembly station, the oven, and the cutting table. A door was provided in the side of the van for the cook to exit the vehicle and deliver the pizza to he door of the customer. Preferably, the vehicle of the '836 patent would be manned by a driver and a cook so that the driver could drive and the cook could remain in the cook's chair to assemble, cook, box and cut pizzas. Naturally, when the vehicle of the '836 was manned by a single worker, the driver would have to find a place to park the vehicle while he moved back to the kitchen area to prepare pizzas to be cooked. Also, the lone operator would have to park in order to remove the cooked pizza from the oven.

U.S. Pat. No. 4,556,046, to Riffel et al. and also assigned to the assignee of the present invention, describe an improved ventilation system for a pizza preparation and delivery vehicle such as that described in the '836 patent. The entire disclosure of the '046 patent is also incorporated herein by reference.

U.S. Pat. No. 4,643,167, to Brewer and also assigned to the assignee of the present invention, described a further improvement to the ventilation system for an oven within a pizza preparation and delivery vehicle. By the time the application for the '167 patent was filed, the preferred vehicle had been downsized to a typical full-size van, such as the FORD "Econoline". The kitchen layout was the same in the '167 patent as in the '836 and '046. That is, the new vehicle included a driver's station and a kitchen area with a cook's chair and a conveyor oven. The new vehicle also included a separate electrical generator.

Co-pending U.S. Pat. Application Ser. No. 258,969 describes a compact pizza preparation and delivery vehicle which has solved some of the problems mentioned above. In particular, a vehicle which is less costly to purchase, operate, and maintain is described therein. One feature of the described embodiment is that the overall vehicle is much smaller in size. Another feature is that the vehicle does no require a separate generator to supply electrical power to the equipment on the vehicle.

One of the challenges in the development of the described vehicle was that of providing a safety system for the vehicle. Tat is, it was considered critical that the vehicle be absolutely safe even in the face of a collision, rollover, gas leak or fire.

SUMMARY OF THE INVENTION

Briefly stated, the present invention is a safety system for a gas operated appliance in a vehicle. The system includes means for generating an electrical signal, such as a pre-determined voltage. The system also includes means for interrupting this electrical signal. One such means is a gas sensing means which is designed to interrupt the electrical signal in response to sensing gas. Another such means is an inertia switch means which interrupts the electrical signal in response to detecting a rapid changes in vehicle inertia or vehicle orientation. Yet another such means is a high temperature switch means which interrupts the electrical signal in response to detecting an elevated temperature in an area near said appliance. Finally, the system includes an emergency kill switch means for manually interrupting the electrical signal. The system further includes a fuel tank and a gas line between the fuel tank and the appliance. A valve means is used which is adapted to automatically and mechanically close to thereby stop the flow of gas through the gas line. Coupled with this valve means is a solenoid means designed to open the valve means in response to said electrical signal to thereby allow the flow of gas trough the gas line.

The safety system of the present invention provides significant advantages.

It is noted that the term "vehicle" is intended to have a relatively broad meaning including all types of mobile structures such as cars, trucks, vans, boats, carts, and trailers, etc.

Also, the term "appliance" is also intended to have a relatively broad meaning including such appliances as ovens and refrigerators.

In addition, the term "gas" is intended to refer to any type of gaseous fuel such as propane or natural gas.

The present invention, together with attendant objects and advantages, will be best understood with reference to the detailed description below read in conjunction with the accompanying drawings.

DETAILED DESCRIPTION OF THE PREFERRED EMBODIMENTS

Figure 1:
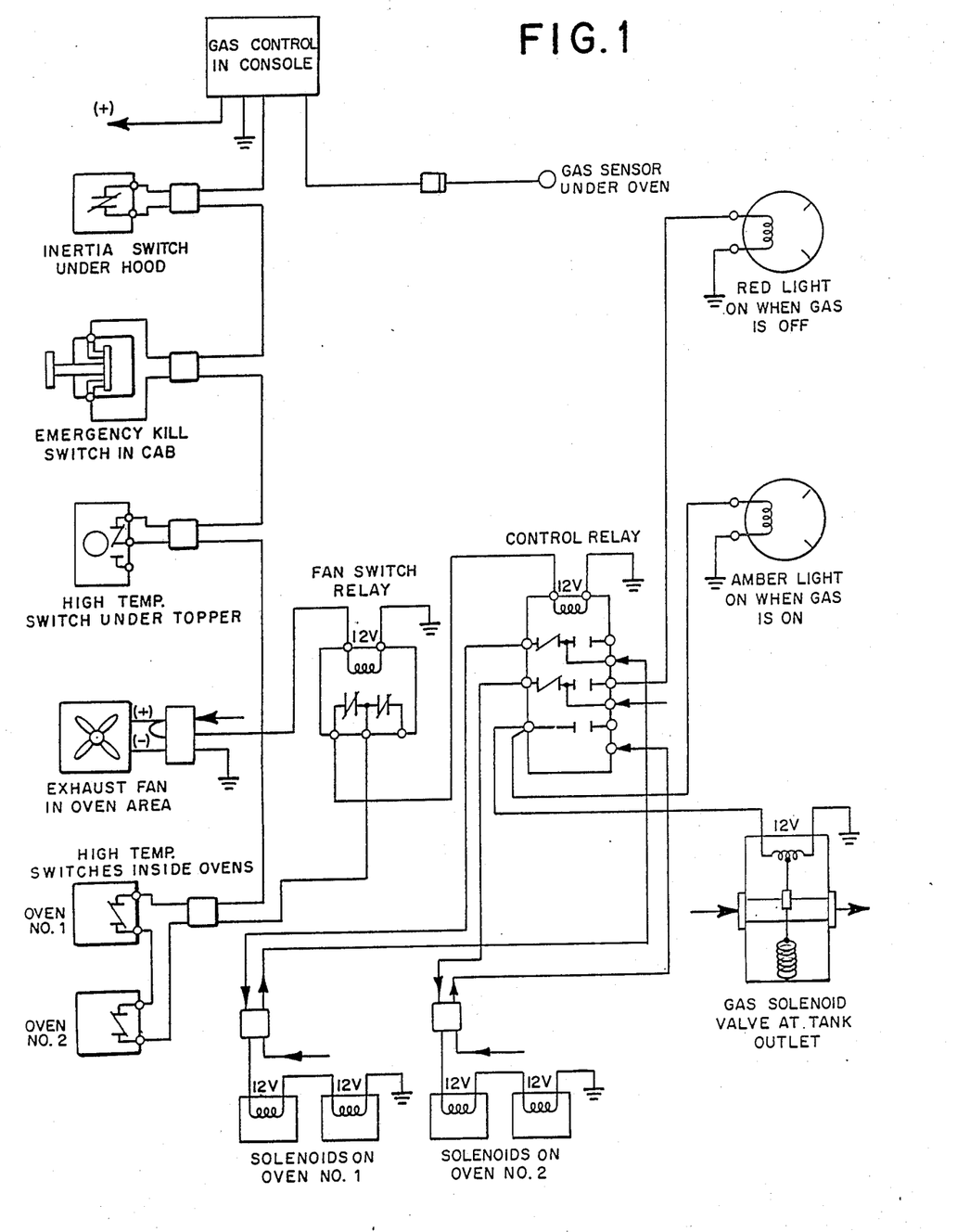
FIG. 1 is a schematic diagram of the safety system of the most preferred embodiment.

Referring to the drawings, FIG. 1 is a schematic diagram illustrating the preferred safety system for a vehicle.

Starting at the bottom right side of the diagram, the system includes a solenoid operated valve at the outlet of the fuel tank. This valve is automatically and mechanically closed, e.g. by a spring. A solenoid is provided to open the valve, and thus allow the flow of gas through the gas line. Preferably, this solenoid is activated by 12 volts passing through the circuit.

Similar automatic, mechanical valves 252 (see FIG. 7) are also located on the gas lines going into each of the two oven units. Like the valve at the fuel tank outlet, a solenoid is provided for opening each of these valves in response to an electrical signal. Preferably, the electrical signal is 12 volts applied across the circuit.

In light of the above description, it is seen that these valves operate to automatically and reliably shut off the flow of gas from the fuel tank and to the appliances when 12 volts is not applied across the circuit.

Moving now to the top of the diagram, the safety system includes a gas control unit, preferably located in the console of the vehicle's cab. This control unit is preferably adapted to supply a pre-determined voltage across the circuit. Alternatively, the control unit can supply another type of electrical signal.

A gas sensor is connected to the control unit. Preferably, upon sensing the presence of gas in the area near the appliance, the gas sensor is designed to generate a signal which interrupts the electrical signal from the control unit. When used with the vehicle shown in FIGS. 2–6, the gas sensor is preferably located 2" above the floor of the cargo bed on the oven support leg nearest the burners for the oven.

In the most preferred embodiment, the solenoid activated valve at the fuel tank, the control unit, and the gas sensor are purchased as a set from the NEWTEC CO. under their designation "GDC-1".

The system of the present invention also includes an inertia switch, such as that sold by the FORD MOTOR CO. under their designation "#E1AZ9341 B". Preferably, this switch is placed under the hood. This switch is designed to interrupt the signal in the circuit in the event the vehicle experiences a sudden impact, i.e. in a collision, or an inverted position, i.e. in a rollover. Preferably, the signal is interrupted b placing the inertia switch in series with the circuit to which the control unit supplies its 12 volts.

A high temperature switch is also included in the safety system of the present invention. This switch is designed to interrupt the signal generated by the control unit. As with the inertia switch, this preferably accomplished by placing the high temperature switch in series with the control circuit so that the signal can be interrupted by opening of the circuit by the high temperature switch. When used with the vehicle described below, the high temperature switch is preferably located on the underside of the topper in the oven compartment. Preferably, this sensor is set to open the circuit if the temperature inside the topper reaches about 250° F.

In the preferred embodiment, a second high temperature switches is also included within the appliance itself. In the most preferred embodiment, wherein the appliance is a dual oven, a high temperature switch is included in each of the two oven chambers. Preferably, these switches are set to open the main power circuit if the temperature in either oven chamber exceeds about 625° F., i.e. a preset temperature about 100° F. above the normal operating temperature of the oven.

In the most preferred embodiment, the safety system also includes means for determining that the oven's blowers are functioning. This can be accomplished by using a standard air switch which is set to detect a difference in air pressure to indicate that the blowers are functioning.

An emergency kill switch 79 (see FIG. 6) is provided for the driver on the dash of the vehicle. Preferably, this switch will manually open the control circuit and thus give the driver of the vehicle a quick and easy way to shut down the gas flow from the fuel tank. Naturally, this switch should be clearly labeled, preferably lighted. In the preferred embodiment, the switch must be pulled out before the oven can be operated.

Preferably, an exhaust an is included in the safety system of the present invention. In the most preferred embodiment shown with the vehicle described below, the exhaust fan set within the topper to exhaust the oven compartment through ventilation port 21 (see FIG. 3). As can be seen in FIG. 1, the circuit is designed so that the fan always runs when the solenoids are energized. That is, the exhaust fan runs whenever the gas flows from the tank and into the ovens. Preferably, the circuit is also designed so that if this fan's operation is interfered with, the relay also closes the solenoids at the fuel tank and ovens. In the depicted embodiment, this is accomplished by having the circuit interrupted if power to the fan is interrupted. Most preferably, this can also be accomplished by including an air switch or rotation sensor which would actually monitor if the fan was blowing air. In addition, it is preferable to configure the circuit so that the fan continues to be powered if the signal from the control unit is interrupted.

It is noted that the exhaust fan serves at least two functions in the preferred safety system. First, the fan is useful in venting the combustion products produced by the appliance, e.g. CO. In addition, the exhaust fan is useful in venting the area near the appliance in the case of any gas leaks.

Preferably, the system includes an indicator to the vehicle operator to show when the electric signal has been interrupted, i.e. that the gas flow has been shut off. Also, the system preferably includes an indicator that the electrical signal is being generated, i.e. that the gas is allowed to flow. In the vehicle shown below, this is preferably accomplished by providing indicator lights for the driver to see the status of the safety system. A red light is adapted to be turned on whenever tee gas has been shut off. An amber light is adapted to be turned on whenever the gas is flowing.

As seen in FIG. 1, the circuit also includes a control relay and a fan switch relay. Most preferably, the control relay is one such as that sold by the Irby Co. under the designation "IDEC #RR-38VLDC12V with SR38-05 Base." The most preferred fan relay is also sold by the Irby Co. and has the designation ""IDEC #RR-3B-UL DC 12V with #SR3B-05 Base."

FIGS. 2-6 show the most preferred vehicle in which the safety system of the present invention is used. The inventions embodied in this vehicle are described and claimed in a co-pending U.S. patent application Ser. No. 258,969 filed on the same day and assigned to the same assignee as the present application.

Figure 2:
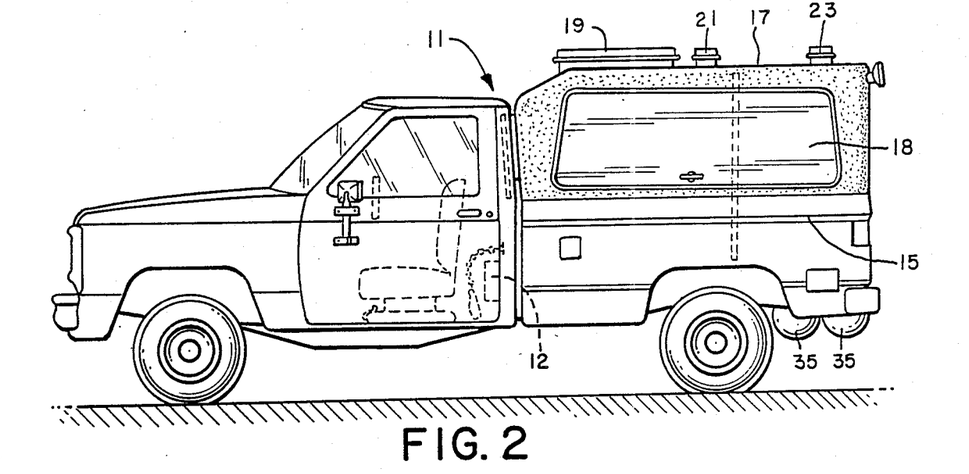
FIG. 2 is a driver's side view of the vehicle in which the most preferred embodiment of the present invention is used.

FIG. 2 is a view from the driver's side of the pizza preparation and delivery vehicle 11. The vehicle 11 is a pickup truck which has been modified in the ways to be described below. The pickup truck shown is a FORD Ranger model "Regular Cab 2-wheel drive". This particular truck is generally considered a "mini-pickup" as opposed to a midsize or fullsize. This pickup truck has a payload capacity of approximately 1612 pounds and a Gross Vehicle Weight Restriction (GVWR) of 4260 pounds. The cargo bed of this truck is approximately 77" long and 54" wide. The engine is a 2.3 liter 4 cylinder.

Figure 3:
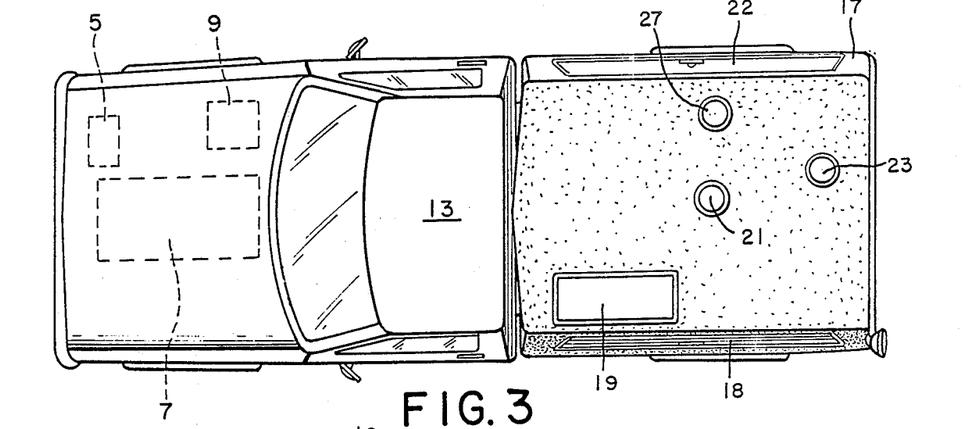
FIG. 3 is a top view of the vehicle shown in FIG. 2.
Figure 4:
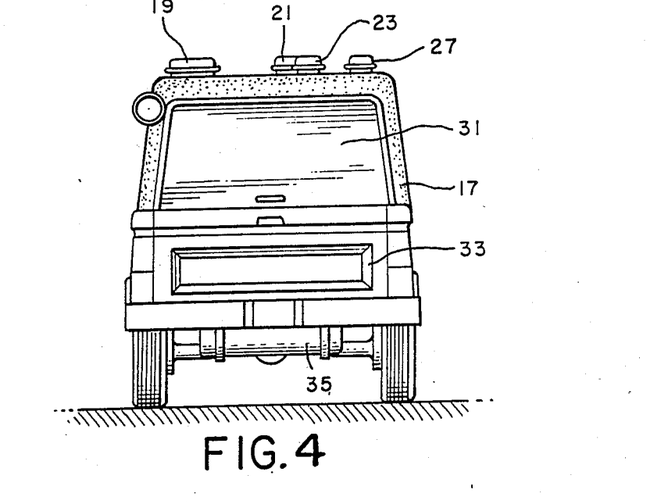
FIG. 4 is a rear view of the vehicle shown in FIG. 2.

Referring to FIGS. 2-4, the vehicle 11 includes a driver's compartment or cab 13. The vehicle also includes a cargo bed 15 with a tailgate 33. A topper 17 is mounted over the cargo bed 15 to create a cargo compartment. With the exceptions noted below, the topper 17 is an otherwise conventional topper for pickup trucks. The particular topper shown was obtained from GUIDON CO. under the designation "RENEGADE II".

The topper 117 includes four doors hinged at the top and securely latched at the bottom. Door 18 is on the driver's side of the topper and provides access to the oven. Door 22 is on the passenger side of the topper and also provides access to the oven. Door 31 is at the rear of the topper and provides access to the supplemental refrigerated case.

The topper 17 also includes four ventilation ports. Port 19 is a conventional wind driven port such as that found on recreational vehicles and operates to pull air from the cargo compartment when the vehicle is in forward motion. Port 27 is driven by an electric fan. Port 21 covers the flu of the pizza oven. Port 23 allows air to be vented from the rear compartment. A positive air pressure is created in the rear compartment by the fan 142 located in the cargo bed (See FIG. 20).

Fuel tanks 35 are located underneath and near the rear of the cargo bed 15.

Figure 5:
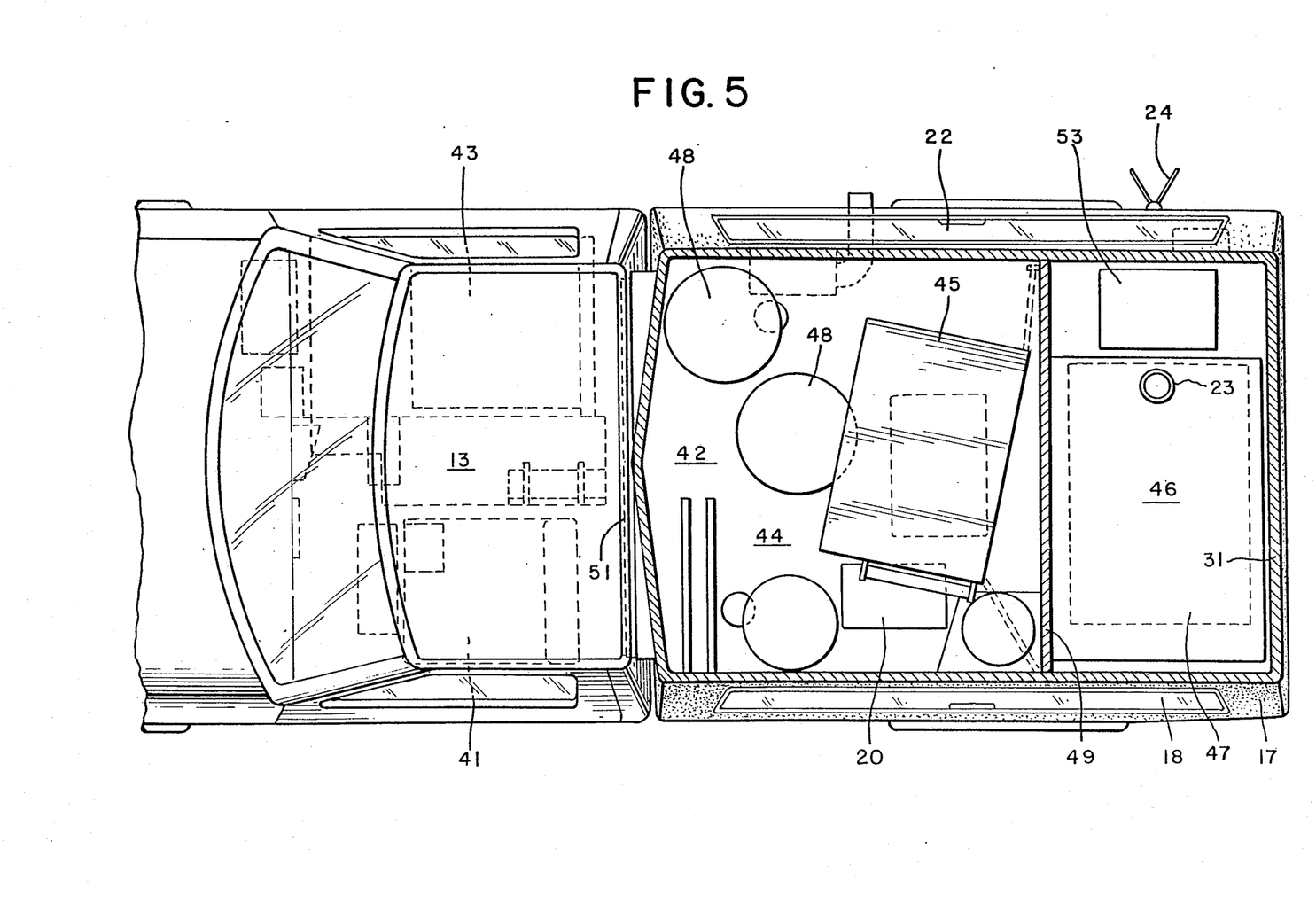
FIG. 5 is top view showing the layout of the various elements of the vehicle shown in FIG. 2.

FIG. 5 is a view intended to show the most preferred lay-out of the equipment in the vehicle 11. The cab of the pickup truck is designated as the driver's compartment 13. Within the driver's compartment is the driver's seat 41. Also within the driver's compartment is a refrigerated case 43. The cargo compartment of the vehicle is separated from the driver's compartment by window 51 (see FIGS. 12-14). A dividing wall 49 serves to separate the cargo compartment into an oven compartment 44 and a refrigerated case compartment 46. Curb feelers 24 are preferably included.

A pizza oven 45 is located in the oven compartment 44 and positioned so that the driver can insert an unbaked pizza and remove a baked pizza from the oven while sitting in the driver's seat. Further details of the oven are given below in connection with FIGS. 23-34.

A supplemental battery 20 is located in the cargo compartment. This battery is recharged by the alternator for the truck engine. It has been found preferable to use a supplemental battery to power the equipment in the vehicle rather than using the original battery for the engine. One reason for this is so that the starting of the vehicle is kept separate from the operation of the equipment on board. Most preferably, the supplemental battery is a 12 volt marine type, series 27 Exide Battery #5231.

A supplemental refrigerated case 47 is located at the rear of the cargo compartment and is thus accessible through the rear door 31 of the topper 17. Compressors 53 and 54 are also located at the rear of the cargo compartment. Preferably, the upper compressor 53 cools the supplemental refrigerated case 47, while the lower compressor 54 cools the refrigerated case in the driver's compartment 43 by means of coolant lines passing therebetween.

Figure 6:
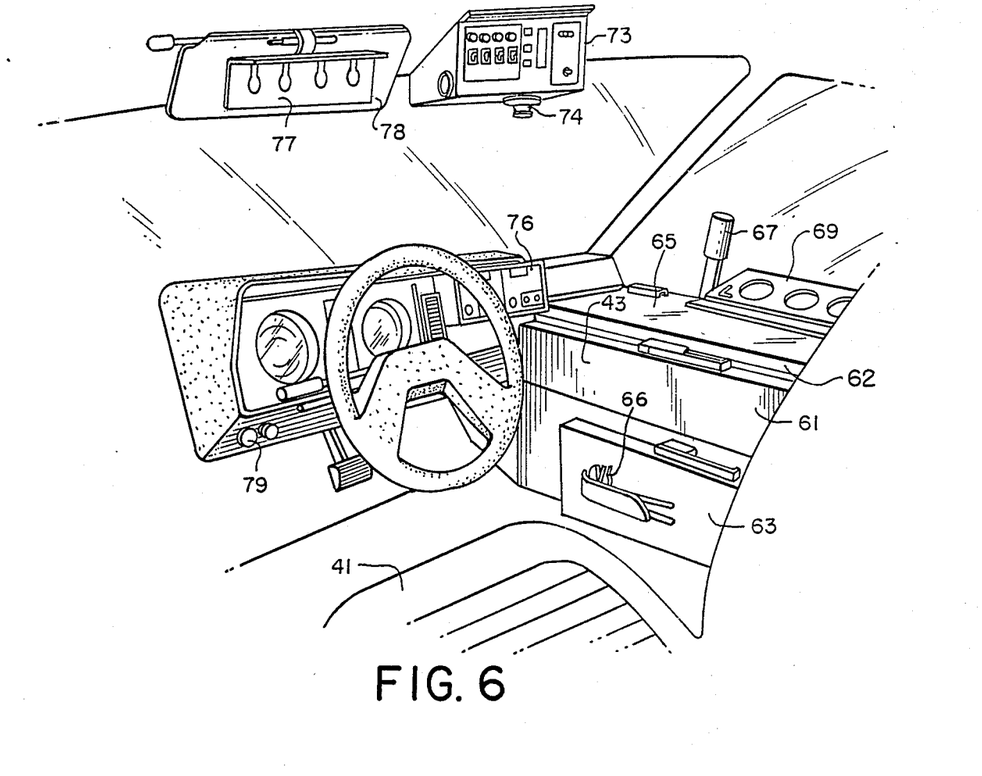
FIG. 6 is a perspective view of the interior of the driver's compartment of the vehicle shown in FIG. 2.

FIG. 5 is a perspective view looking into the driver's compartment from the driver's door. As can be seen, the passenger's seat has been removed from the pickup truck and replaced by a refrigerated case 43. The top of the refrigerated case 43 is adapted to serve as a preparation table 65 on which the uncooked pizza shell is placed while the topping are put on. The table 65 also serves as the surface on which the baked pizza is boxed and cut.

Placing the refrigerated case 43 and the preparation table 65 in what would otherwise be the passenger's side of the cab is advantageous because it allows the driver to assemble, box, and cut a pizza while sitting in the driver's seat.

A door handle extension 67 has been attached to the passenger door handle so that the driver can unlock and open the passenger door in the event of an emergency need to exit through the passenger door.

An electrical systems control box 73 is installed on the ceiling of the cab. This box includes switches to control the lights and the other electrical systems of the vehicle, namely the interior lights, rear spot light, safety system, oven, refrigerated cases. A volt meter is also included control box 73. A working light 74 is included on the bottom of the control box 73.

An oven control box 71 is mounted on the dash. This oven control box includes the switches to operate the pizza oven of the vehicle. Because the preferred pizza oven actually includes two stacked baking units, the preferred oven controller includes identical controls for the top and the bottom baking units.

The preferred oven controller means has several function. The primary function is to serve as an oven timer. That is, the controller means sets the proper baking cycle for the oven. This is preferably accomplished by including an electronic timer which is set at the proper time when the pizza is inserted in the oven and then counts down to zero while the pizza is being baked. When the timer reaches zero, a signal is generated. Preferably, this signal will generate an audible signal to the driver as well as a lighted indicator that the baking cycle is completed.

As described below (see FIGS. 23, 26–28), the oven doors are equipped with actuators which can automatically open the oven doors and bring the baked pizza out of the oven. Thus, in this embodiment, at the conclusion of the preset baking cycle, the oven controller means will also generate a signal to the door actuator means so that the doors are opened and the pizza is removed.

This feature of automatically removing the pizza from the oven at the conclusion of the baking cycle is highly advantageous in that it prevents the pizza from becoming overcooked if the driver is unable to stop the vehicle, or if the driver is away from the vehicle making another delivery.

Another feature of the preferred oven controller means is that it is also adapted to conserve electrical energy. The preferred oven is an impingement oven wherein heated air is impelled by high-speed fans or blowers toward the top and bottom of the pizza. The oven controller means is programmed to step up the speed of the fans to the operating speeds at the beginning of the baking cycle. At the end of the baking cycle, the fan speed is reset to an energy saving idle speed. In addition, the oven uses a powered turntable to rotate the pizza during cooking. For the same reasons, the oven controller means will preferably switch the turntable on and off to coincide with the baking cycle.

Most preferably, the oven controller means is configured so that the driver simply pushes a "door open" button to begin the baking process. In response to pushing the initial button, the door actuator opens the door of oven. The driver then places the pizza, preferably in a pan, onto the turntable of the oven. A second button, "start bake" button is pushed. In response, the oven controller generates the signal to close the door, to step up the speed of the fans, to switch the turntable on, and to begin timing the baking cycle. Most preferably, the oven controller provides a visual readout, such as by LED, of the time remaining for each baking cycle. At the conclusion of the baking cycle, the controller means generates an audible signal, such as a beep for 30 seconds, and also generates the signal to the door actuator to open the oven door.

The most preferred driver's compartment includes a few other special features. Mounted on the visor 75 is a order holder 77 which can be used to retain the customer pizza orders until completed. Also, a special safety button 79 is included. As explained above, this button acts as an emergency kill switch to shut off the flow of gas from the tanks. According to the preferred safety system, none of the solenoid operated valves on the fuel tanks or ovens will open unless the switch is pulled out. Naturally, this switch should be well labeled and lighted.

Figure 8:
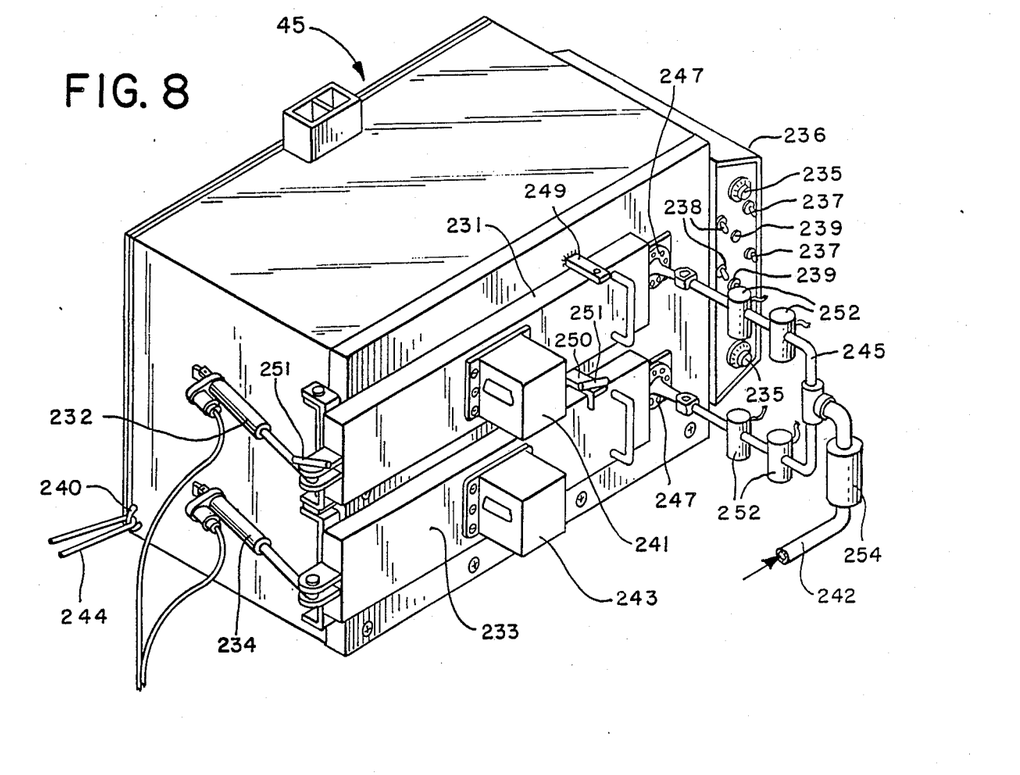
FIG. 8 is an exploded view of the cargo compartment of the vehicle of FIG. 2 showing the topper and the support frame with the oven and supplemental refrigerated case mounted thereon.

FIG. 8 shows the frame member 201 which is used to mount the equipment for the vehicle 11. The frame ember 201 includes support bars on which the oven is mounted. The dividing wall 49 is adapted to fit within slots in the frame member 201. The dividing wall is most preferably a 0.10" sandwich laminate of aluminum sheet on a 1.0" core of polyurethane foam. FIG. 8 shows the frame member 201 with the equipment mounted thereon and ready to be inserted and attached within the cargo bed 15. As can be seen, the supplemental refrigerated case 47 and the compressors are located behind the dividing wall 47. The oven 45 is mounted in front of the wall 49. Preferably, the various pieces of equipment are mounted on the frame member 201 before it is inserted into the cargo bed of the truck.

For sanitation purposes, a hand pump-operated sink 203 is included along with an insulated tank 205 for supplying hot water to the sink 203. The sink 203 drains into a waste water tank under the oven (not shown). The waste water tank includes an outlet and valve for draining the waste water at the appropriate location. A bottle of hand soap 204 is preferably mounted on the oven side of the dividing wall 49. Paper towels are held on a dispenser 208 attached to the control panel of the oven. As another sanitary measure, disposable plastic gloves can be used by the drivers when handling the pizzas and ingredients.

The frame member 201 also preferably includes a bracket 209 for storing medium and large flat pizza boxes 211.

Figure 7:
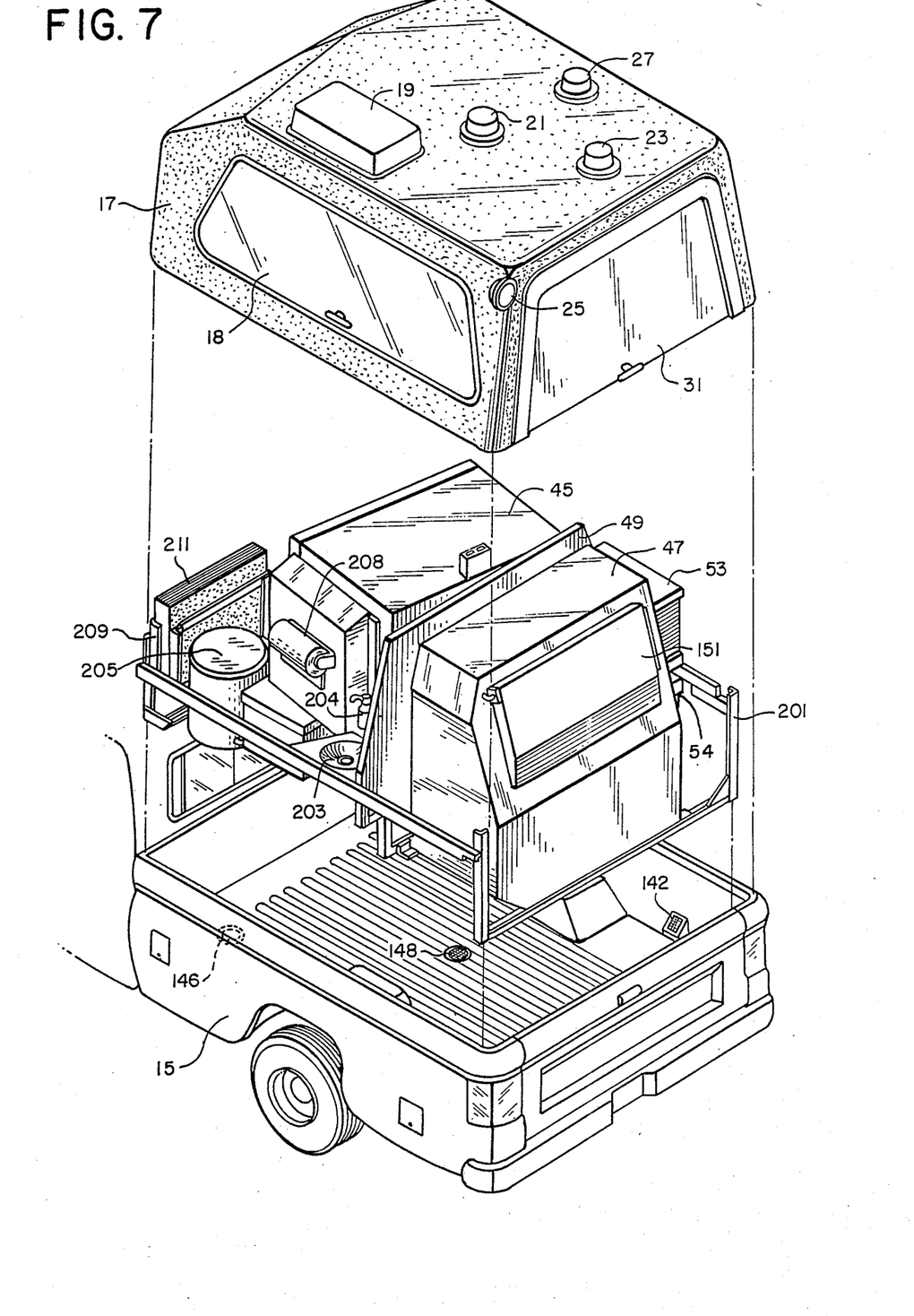
FIG. 7 is a perspective view of the front and side of the double oven used in he safety system shown in FIG. 1.

FIG. 7 illustrate the pizza oven 45 used in the most preferred embodiment of the present invention. The inventions embodied in this oven are described and claimed in a co-pending U.S. patent application Ser. No. 258,967 filed on the same day and assigned to the same assignee as the present application.

FIG. 7 is a perspective view showing the front and top of the preferred oven 45. As can be seen, the oven 45 is a dual oven, i.e. includes a top and a bottom oven unit. The dual oven 45 is mounted to te frame member supports 199 with shock mounts to lessen the impact to the oven.

As shown, the top and bottom oven unit each have a door 231 and 233 respectively. These doors are preferably operated by actuators 232 and 234 respectively. Mounted on each of the doors is a motor housing 241 and 243.

In the event of door actuator failure, the actuator pivot pin 251 can be removed from its location on the actuator and the door then opened. The same pin 251a can then be inserted into the hole 250 above the oven door to hold the door closed during the baking cycle.

On the left side of the oven is a control panel 236. Preferably, the controls are mounted to the side of the oven with rubber grommets and so that a gap is left between the two. In this way, the controls are subjected to less vibration and heat from the oven. The controls include a toggle switches 237 for each of the blower motors and toggle switches 238 for each of the burners. A temperature control dial 235 and a "burner on" indicator light 239 are also included for each oven unit.

Gas line 242 bring gas from the fuel tank and through a filter 254. The line is the split into lines 245 which pass through the 2 solenoid operated valves 252 on each line. As mentioned above, the valves 252 are designed to be mechanically closed when 12 volts does not pass to them to each of the burners 247.

A tie-down loop 240 is attached at the rear of the oven and a cable 242 is attached to the frame of the pickup to thus restrain the oven from moving forward in the event of a crash.

It should be noted that although much of the discussion has involved the use of the present safety system for use with a mini-pickup truck modified to prepare and deliver pizza, other types of vehicles and other types of appliances can also be used. For example, vans, trailers, boats, and the like can also be used in the present invention. Also, other appliances such as propane powered refrigerators can also be used. Certainly, the present invention provides increased safety or such vehicles. Accordingly, these and all other modifications which are within the ordinary skill in the art to make are considered to lie within the scope of the invention as defined by the appended claims.

I claim:

1. A safety system for a gas operated appliance in a vehicle comprising:
    means for generating an electrical signal;
    gas sensing means for interrupting the electrical signal in response to sensing gas;
    inertia switch means for interrupting the electrical signal in response to detecting a rapid change in vehicle inertia or vehicle orientation;

high temperature switch means for interrupting the electrical signal in response to detecting an elevated temperature in an area near said appliance;

emergency kill switch means for manually interrupting the electrical signal;

fuel tank means for storing gas to be used by the appliance;

a gas line for gas to flow from the fuel tank means to the appliance;

valve means adapted to automatically and mechanically close to thereby stop the flow of gas through the gas line; and solenoid means for opening said valve means to thereby allow the flow o gas through the gas line in response to said electrical signal.

2. The safety system of claim 1 further comprising exhaust fan means adapted to exhaust the area near the appliance.

3. The safety system of claim 2 wherein the exhaust fan means is adapted to be on whenever the electrical signal is generated, and wherein the system further comprises fan failure detecting means for interrupting the electrical signal in the event of fan failure.

4. The safety system of claim 3 wherein the system further comprises means for supplying power to the exhaust means in tee event the electrical signal is interrupted.

5. The safety system of claim 1 further comprising indicator means for indicating to a vehicle operator that the electronic signal has been interrupted.

6. Te safety system of claim 5 wherein the indicator means is also adapted to indicate to the vehicle operator that the electrical signal is generated and not interrupted.

7. The safety system of claim 1 further comprising second high temperature switch means located within the appliance for interrupting the electrical signal in response to an elevated temperature within the appliance.

8. The safety system of claim 1 wherein the appliance is an oven.

9. The safety system of claim 8 further comprising second high temperature switch means located within the oven for interrupting the electrical signal in response to an elevated temperature within the oven.

10. The safety system of claim 1 wherein the valve means and solenoid means are located near the outlet of the fuel tank.

11. The safety system of claim 10 further comprising a second valve means adapted to automatically and mechanically close to thereby stop the flow of gas through the gas line, and a second solenoid means for opening said valve means to thereby allow the flow of gas through the gas line in response to said electrical signal.

12. The safety system of claim 11 wherein the second valve means and second solenoid means are located near the appliance.

13. The safety system of claim 1 wherein the inertia switch means, the high temperature switch means, and the emergency kill switch means are all connected to the circuit in series and interrupt the electrical signal by opening the circuit.

14. A safety system for a gas operated appliance in a vehicle comprising:

means for supplying a predetermined voltage to a circuit;

gas sensing means for interrupting the voltage in response to sensing gas;

inertia switch means for opening the circuit in response to detecting a rapid changes in vehicle inertia or vehicle orientation;

high temperature switch means for opening the circuit in response to detecting an elevated temperature in an area near said appliance;

emergency kill switch means for manually opening the circuit;

fuel tank means for storing gas to be used by the appliance;

a gas line for gas to flow from the fuel tank means to the appliance.

valve means adapted to automatically and mechanically close to thereby stop the flow of gas through the gas line; and solenoid means for opening said valve means when said predetermined voltage is applied across the circuit to thereby allow the flow of gas through the gas line.

15. The safety system of claim 14 further comprising exhaust fan means adapted t exhaust the area near the appliance; wherein the exhaust fan means is adapted to be on whenever the electrical signal is generated; and wherein the system further comprises fan failure detecting means for interrupting the electrical signal in the event of fan failure.

16. The safety system of claim 15 wherein the system further comprises means for supplying power to exhaust means in the event the signal is interrupted.

17. The safety system of claim 14 further comprising indicator means for indicating to a vehicle operator that the signal has been interrupted.

18. The safety system of claim 17 wherein the indicator means is also adapted to indicate to the vehicle operator that the circuit is closed.

19. The safety system of claim 14 further comprising second high temperature switch means located within the appliance for interrupting the electrical signal in response to an elevated temperature within the appliances.

20. The safety system of claim 14 wherein the appliance is an oven.

21. The safety system of claim 20 further comprising second high temperature switch means located within the oven for opening the circuit in response to an elevated temperature within the oven.

22. The safety system of claim 14 wherein the vale means and solenoid means are located near the outlet of the fuel tank.

23. The safety system of claim 22 further comprising a second valve means adapted to automatically and mechanically close to thereby stop the flow of gas through the gas line, and a second solenoid means for opening said valve means in response to said pre-determined voltage being applied across the circuit.

24. The safety system of claim 23 wherein the second valve means and second solenoid means are located near the appliance.

25. A safety system for a gas operated oven in a food preparation vehicle comprising:

means for supplying a predetermined voltage to a circuit;

gas sensing means for interrupting the voltage in response to sensing gas;

inertia switch means for opening the circuit in response to detecting a rapid changes in vehicle inertia or vehicle orientation;

high temperature switch means for opening the circuit in response to detecting an elevated temperature in an area near said appliance;

exhaust fan means adapted to exhaust the area near the oven, wherein the exhaust fan means is adapted to be on whenever the electrical signal is generated, and wherein the system further comprises fan failure detecting means for interrupting the electrical signal in the event of fan failure;

emergency kill switch means located within reach of a driver for manually opening the circuit;

fuel tank means for storing gas to be used by the oven;

a gas line for gas to flow from the fuel tank means to the oven;

valve means adapted to automatically and mechanically close to thereby stop the flow of gas through the gas line; and solenoid means for opening said valve means to thereby allow the flow of gas through the gas line when said predetermined voltage is applied across the circuit.

26. The safety system of claim 25 further comprising indicator means for indicating to a vehicle operator that the signal has been interrupted and adapted to indicate to the vehicle operator that the circuit is closed.

27. The safety system of claim 25 further comprising second high temperature switch means located within the oven for opening the circuit in response to an elevated temperature within the oven.

* * * * *

UNITED STATES PATENT AND TRADEMARK OFFICE
CERTIFICATE OF CORRECTION

PATENT NO. : 4,912,338

DATED : March 27, 1990

INVENTOR(S) : Lynn R. Bingham

It is certified that error appears in the above-identified patent and that said Letters Patent is hereby corrected as shown below:

IN THE BACKGROUND OF THE INVENTION

In column 1, line 20, after "same" please insert --assignee--.

In column 2, line 10, please delete "no" and substitute therefor --not--.

In column 2, line 15, please delete "Tat" and substitute therefor --That--.

IN THE SUMMARY OF THE INVENTION

In column 2, line 43, please delete "trough" and substitute therefor --through--.

IN THE DETAILED DESCRIPTION
OF THE PREFERRED EMBODIMENTS

In column 3, line 60, please delete "b" and substitute therefor --by--.

In column 4, line 30, please delete the second occurrence of "an" and substitute therefor --fan--.

In column 4, line 63, please delete "tee" and substitute therefor --the--.

UNITED STATES PATENT AND TRADEMARK OFFICE
CERTIFICATE OF CORRECTION

PATENT NO. : 4,912,338

DATED : March 27, 1990

INVENTOR(S) : Lynn R. Bingham

It is certified that error appears in the above-identified patent and that said Letters Patent is hereby corrected as shown below:

In column 5, line 32, please delete "117" and substitute therefor --17--.

In column 6, line 49, please delete "function" and substitute therefor --functions--.

In column 7, line 46, please delete "ember" and substitute therefor --member--.

In column 8, line 15, please delete "te" and substitute therefor --the--.

In claim 1, column 9, line 14, please delete "o" and substitute therefor --of--.

In claim 4, column 9, line 26, please delete "tee" and substitute therefor --the--.

In claim 6, column 9, line 31, please delete "Te" and substitute therefor --The--.

In claim 15, column 10, line 23, please delete "t" and substitute therefor --to--.

UNITED STATES PATENT AND TRADEMARK OFFICE
CERTIFICATE OF CORRECTION

PATENT NO. : 4,912,338

DATED : March 27, 1990

INVENTOR(S) : Lynn R. Bingham

It is certified that error appears in the above-identified patent and that said Letters Patent is hereby corrected as shown below:

In claim 22, column 10, line 50, please delete "vale" and substitute therefor --valve--.

Signed and Sealed this

Thirtieth Day of June, 1992

Attest:

DOUGLAS B. COMER

*Attesting Officer*  *Acting Commissioner of Patents and Trademarks*